Sept. 25, 1962  F. H. FRANTZ ETAL  3,055,266
MICROFILM VIEWING AND COPYING APPARATUS
Filed Feb. 14, 1958  4 Sheets-Sheet 2

INVENTOR.
FREDERICK H. FRANTZ
CARL A. ACKERMANN
BY
ATTORNEYS

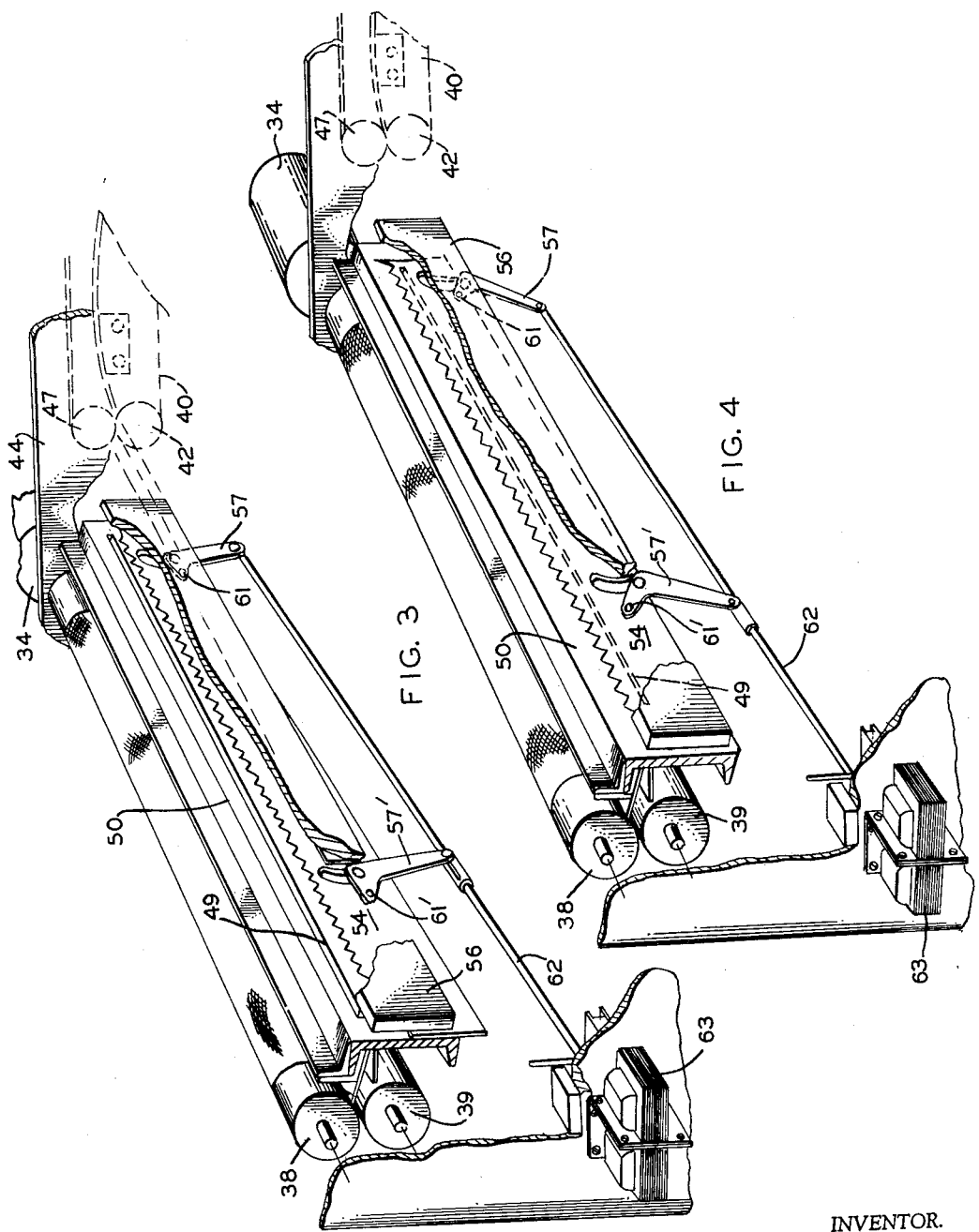

Sept. 25, 1962 F. H. FRANTZ ETAL 3,055,266
MICROFILM VIEWING AND COPYING APPARATUS
Filed Feb. 14, 1958 4 Sheets-Sheet 4
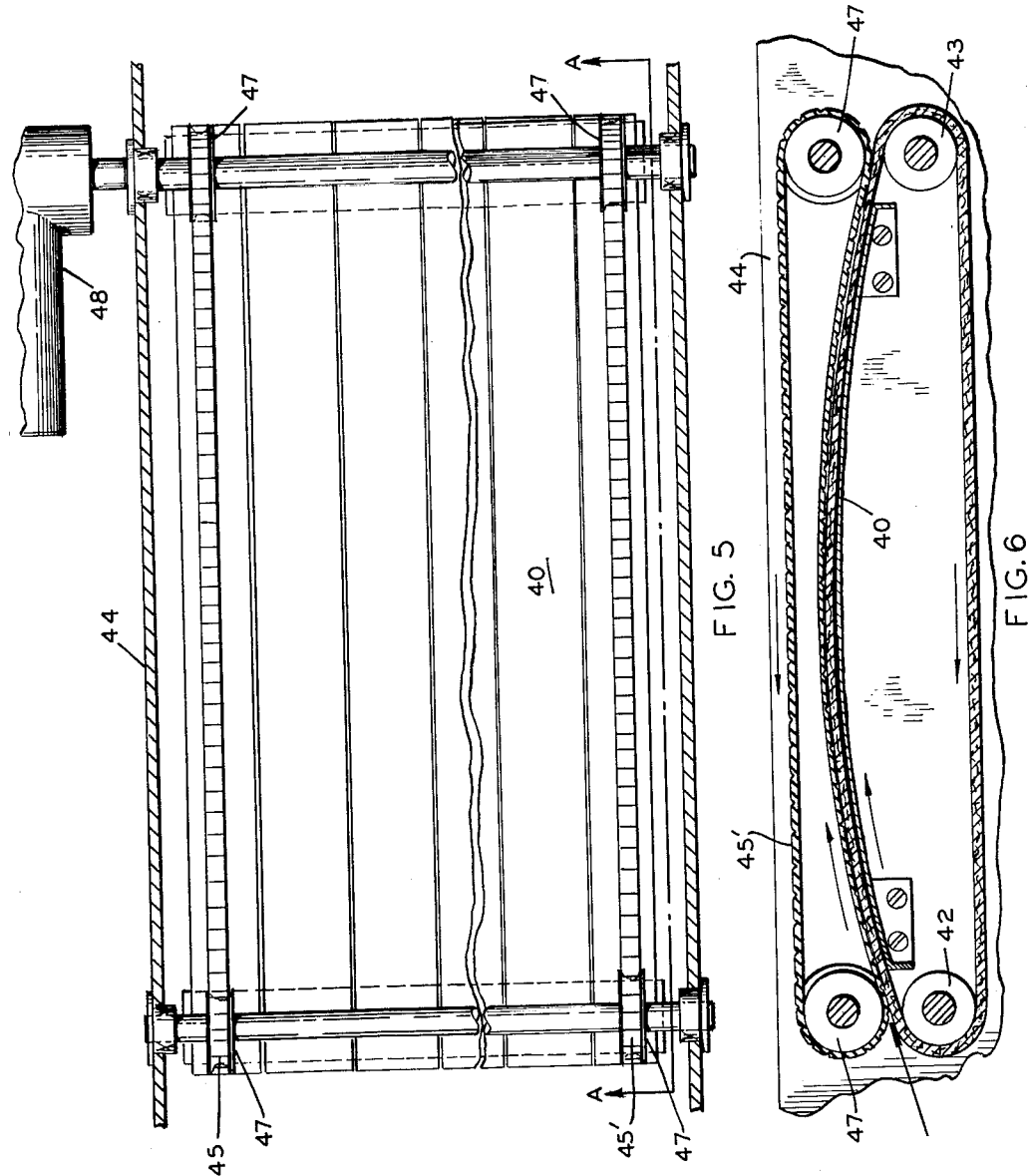
INVENTOR.
FREDERICK H. FRANTZ
CARL A. ACKERMANN
BY
ATTORNEYS 3,055,266
MICROFILM VIEWING AND COPYING
APPARATUS
Frederick H. Frantz, Binghamton, N.Y., and Carl A. Ackermann, Brackney, Pa., assignors to General Aniline & Film Corporation, New York, N.Y., a corporation of Delaware
Filed Feb. 14, 1958, Ser. No. 715,267
1 Claim. (Cl. 88—24)

This invention relates to photocopy apparatus and method and, more particularly, to an apparatus for viewing and copying pictorial information placed on translucent material, such as microfilm.

Microfilm has proved a great space saver in keeping records and finds extensive use. It is generally spooled on reels for preserving, in a greatly reduced form, an exact replica of an original, such as printed matter, drawings, etc.

Use has also been made of microfilm in sheet format, such as filing cards on which the required information is photographed. One card may contain several pages of a book or a number of technical drawings reduced to a size too small to be viewed by the naked eye.

It is the primary object of this invention to provide an apparatus which will handle microfilm in a card format and function to enlarge, project and make copies of the pictorial information present on such cards.

It is a particular feature of the invention that the apparatus in accordance therewith has great flexibility, is automatic in its various phases of operation and requires no special skill in handling.

Other objects and features will be apparent from the following description of the invention, pointed out in particularity in the appended claim and taken in connection with the accompanying drawings in which:

FIG. 3 is a perspective view of the paper cutting knife in rest position;

FIG. 4 is the same view as FIG. 3 with the knife in actuated position;

FIG. 5 is a top view of the platen or support and feed arrangement of the sensitized material; and FIG. 6 is a sectional view thereof taken along lines A—A of FIG. 5.

Figure 1:
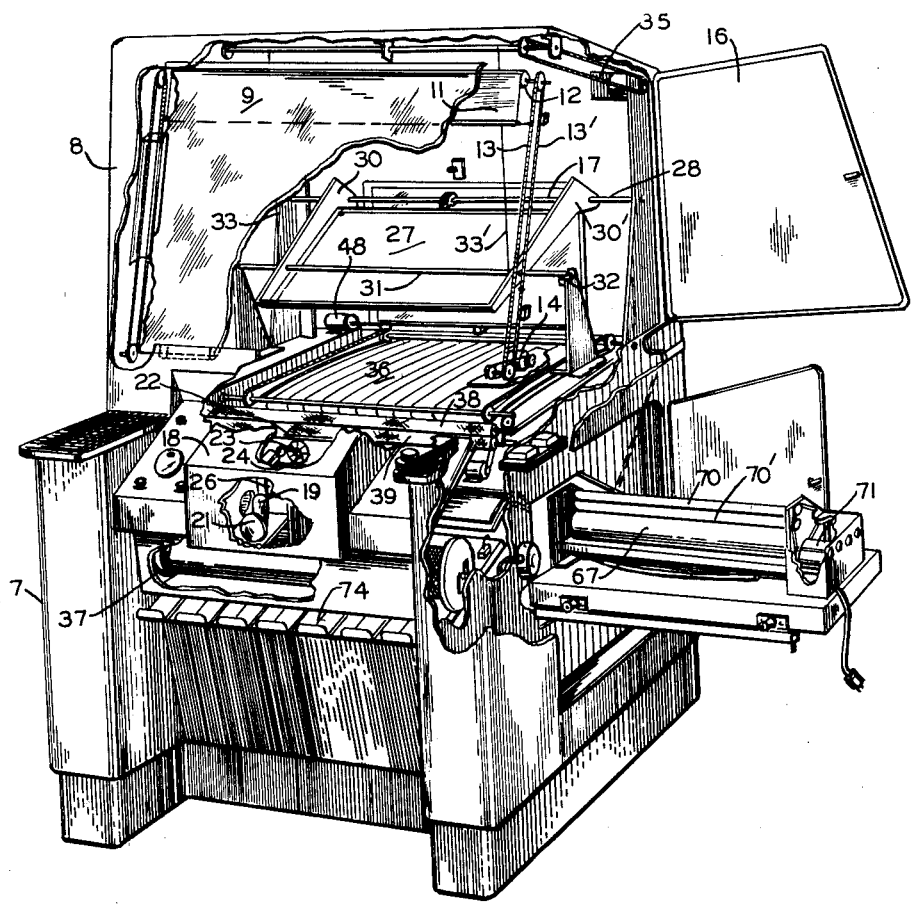
FIG. 1 is a perspective view of the microfilm viewing and copying apparatus with the casing partially broken away to show the major component elements thereof.
Figure 2:
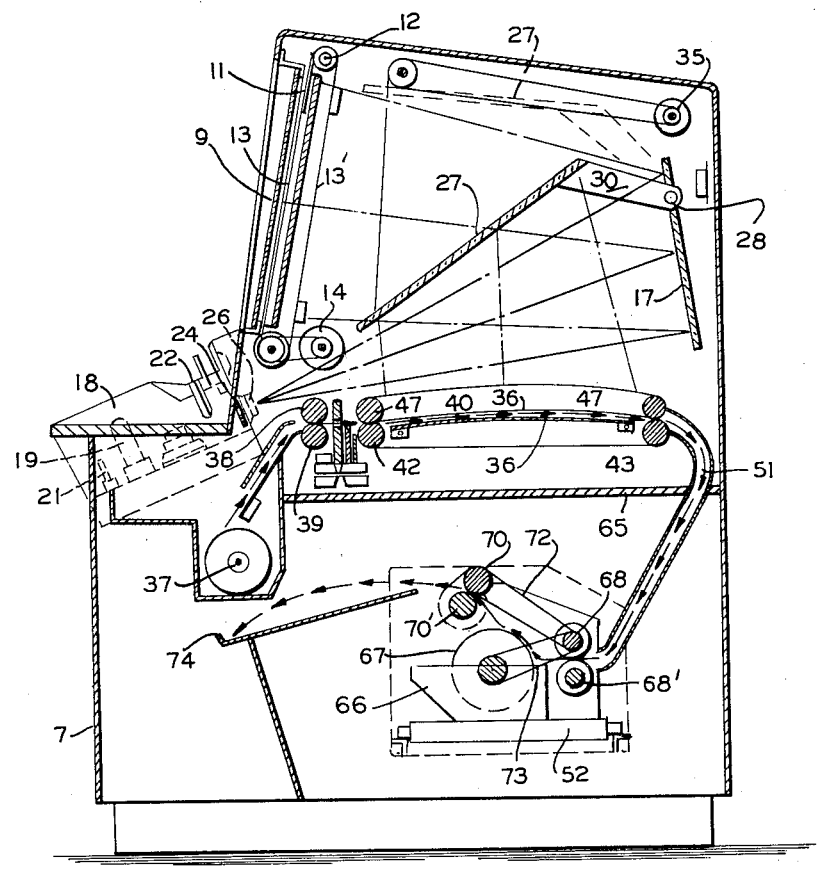
FIG. 2 is a side elevational sectional view in schematic representation of the apparatus.

Referring to the figures, it is seen that the various components of the apparatus, as shown in FIG. 1, are arranged in a cabinet or housing 7, the front of which is recessed to permit an operator easy access to the controls. The upper compartment of the housing 7 has an inclined front wall 8 supporting a large viewing screen 9 of suitable translucent material, such as frosted glass or plastic. Located directly behind the screen 9 is a curtain 11 arranged on a roller 12 which may be drawn up or down by means of the chain drive 13 and 13' actuated by a drive motor 14. The upper compartment of the housing is a light-tight structure, access to the inside being obtained through the door 16. Within the upper compartment of the housing, as seen in FIGS. 1 and 2, is placed a fixed mirror 17 or any suitable optical element which has a reflecting surface facing toward the front of the cabinet, outside of which and attached thereto is a projecting apparatus 18 which may be of conventional design having a projecting lamp 19, reflecting mirror 21 and suitable optical system to project an enlarged view of a microfilm card placed in a slot 22 onto the mirror 17 when a conventional shutter mechanism 23 is opened. The latter may be actuated by a solenoid 24.

The mirror 17 is so oriented with respect to the translucent viewing screen 9 that the projected image may be viewed from the outside of the cabinet, proper focusing being accomplished by the lens 26 of the projector 18. A second mirror 27 is pivotally supported on the shaft 28 by means of the brackets 30 and 30' so that it may be moved to two positions. As seen in FIG. 1, in the downward position, the mirror 27 rests, by means of the cross piece 31, on the support 32, the latter being part of the frame of the assembly. The mirror 27 may be raised up by the wires 33 and 33' to its second position which is indicated by dotted lines in FIG. 2. The lowering and raising of the mirror 27 is effected by the motor 35. When in raised position, it will not obstruct the reflection of the image from the fixed mirror 17 onto the translucent viewing screen 9; whereas, when it is lowered, it takes up an angular position, so calculated as to obstruct the rays from reaching the viewing screen and reflect them downwardly onto a support or platen 36, the purpose of which will be explained later.

Inspecting FIG. 2, it is seen that when the mirror 27 is in the position shown in dotted lines, the image appearing on the inner face of the mirror 17 finds an unobstructed view to be reflected upon the viewing screen 9. In this manner, an enlarged view of the pictorial representation on the card in the projector 18 is viewable on the screen from outside the apparatus. Inasmuch as the viewing takes place from the outer surface of the viewing screen, whereas the projection is on the inner surface, the image viewed is that appearing on the mirror 17. Consequently, in placing the microfilm card onto the projector, care should be taken that the image on the mirror 17 have the proper relationship and not be inverted for viewing purposes.

The second function of the apparatus is to make duplicates or copies when desired from the microfilm card in the projector 18. In order to obtain this, the mirror 27 is lowered into its second position by the motor 35 so that the image from the mirror 17 is now reflected from the mirror 27 downwardly onto the platen 36. The latter is so constructed, as seen in FIGS. 5 and 6, to support a sensitized sheet, such as photographic paper or any other light-sensitive material. The sensitized material is wound on a storage roll 37 from which it is conveyed by the rollers 38 and 39 over endless belts 40 which move over rollers 42 and 43 journalled in suitable bearings affixed to the frame 44 of the machine. The edge of the sensitized material is also held flat against the belts 40 by a pair of moving flexible chain belts 45 and 45' placed around sprockets 47. The chain belts 45 and 45' are preferably of resilient material, such as rubber or plastic, so as to provide good frictional contact with the sensitized material and ride freely on sprockets 47 and 47'.

Rollers 38 and 39 are actuated by a suitable motor 34 (FIGS. 3 and 4), whereas rollers 42 and 43 are driven by motor 48 (FIG. 5). Rollers 38 and 39 convey the paper to the cutting stage consisting of a cutting knife assembly shown in FIGS. 3 and 4. The paper enters through the slot 49 in the frame 50 and then moves over the endless belts 40 in frictional contact with the moving chain belts 45 and 45' resting on the platen 36.

After exposure, the paper is fed by the motion of the endless belts 40 into the channel 51 which curves downwardly and extends into the bottom or developing portion 52 of the apparatus.

Prior to describing the latter, attention is directed to FIGS. 3 and 4 which show the cutting stage. In FIG. 3, the cutting knife 54 which has a serrated edge is supported between the frame 50 and cover plate 56. Two bell cranks 57 and 57' are pivoted on studs 60 and 60', respectively, fastened to the frame 50. The shorter arm of each bell crank is attached to the knife by suitable studs 61 and 61' and the longer arm is connected by means of the actuating rod 62 to the solenoid 63. In FIG. 3, the knife 54 is in rest position whereas, in FIG. 4, it is shown in actuated position. The cutting position of the knife 54 shown in FIG. 4 illustrates that actuation by means of the bell cranks 57 and 57' results in a two-component motion. As the solenoid 63 pulls the rod 62, the knife 54 moves upwardly and then transversely. In this manner, the sensitized material is properly and accurately cut at the slot 49 without leaving a frayed edge.

As mentioned before, the lower portion of the machine below the dividing wall 65 contains the developing apparatus. The latter, when photographic paper is used for the reproduction medium consists of a tank 66 which contains the developing solution. Partially submerged in this solution is an applicator roll 67, in contact with which the paper travels between two pairs of feed rollers 68 and 68' and outfeed rollers 70 and 70'. These rollers are driven directly from the applicator roll 67 which is actuated by the motor 71, shown in FIG. 1.

The interconnection between these rollers by means of the belts 72 and 73 is such that the direction of rotation of the applicator roll 67 is opposite to the movement of the paper which is indicated by the arrows. A receiving tray 74 is arranged in such a manner that the developed sheet is deposited therein, access to this being from the front of the machine as seen in FIG. 1.

Referring to the operation, the various motive parts pointed out before are actuated by small electric motors which are interconnected by conventional relay circuits (not shown here) to start and stop at desired cycles of operation. When the projector is energized and a card is placed into the slot 22, the shutter 23 is opened so that the enlarged projected picture may be viewed by reflection from the mirror 17 on the translucent screen 9. If it is desired to make a copy of this picture, the motor 35 is energized so as to lower the mirror 27. At the same time, the motor 14 is also energized to lower the curtain 11 behind the translucent screen 9. The purpose of the curtain 11 is to shut off any extraneous light which might penetrate through the translucent screen 9 and adversely affect the sensitized material on the platen 36.

The shutter 23 is then closed and the motors 34 and 48 for feeding the sensitized paper from the roll 37 are energized until sufficient paper is fed to cover the platen 36. The shutter 23 is then opened for a predetermined time, which may be governed by any suitable photographic timing apparatus, to expose the sensitized material to the image reflected from the mirror 27. After the exposure time, the sensitized material is again moved a sufficient extent to permit a fresh supply of the same sheet to be placed over the platen 36 for the next exposure. If it is desired to obtain individual sheets for each exposure, the knife solenoid 63 is energized to cut off the exposed portion from the supply roll. The exposed sheet is then fed to the developing apparatus between infeed rollers 68 and 68', the solution being applied by the roller 67. Outfeed rollers 70 and 70' are of the squeegee type so that most of the developer liquid is removed from the sheet reaching the tray 74. Photographic papers for the purpose herein shown are preferably of the type which may be developed by a monobath solution requiring no fixing at all.

Instead of the photographic type developing shown here, other types of sensitized material may be employed, e.g., diazotype materials or materials utilizing an electrophotographic process where an electrostatic image is formed from the exposure and is then developed by means of electrostatic attraction of minute particles. In the latter case, the developing unit shown here is replaced by a type suitable for processing electrophotographic materials. For this reason, the developing unit is easily removable, being arranged to slide out from the apparatus over rollers 76, giving easy access for servicing and cleaning.

We claim:

In a microfilm viewing and copying apparatus, a light-tight housing, a projector associated therewith and adapted to project an enlarged image from a microfilm original placed therein, a fixed optical element having a reflecting surface within said housing oriented to receive said image, a translucent viewing screen in one wall of said housing optically oriented with respect to said fixed reflecting surface to receive on its inner side the rays reflected therefrom, said projected image being viewed from the outer side of said screen, a movable optical element having a reflecting surface within said housing, means for moving said optical element in the path of the rays reflected from said first element, a roll of light-sensitive web material, motor means for feeding said material over a support oriented in said housing to have the rays reflected from said movable element impinge upon it, thereby exposing said sensitized material, a shutter means for regulating the exposure time and cutting means for severing the web subsequent to exposure; the improvement comprising a guide member having a slot therein through which said web moves after exposure, a serrated-edge knife adjacent said guide member, drive means for moving said knife to cut an exposed portion of the web after its passage through said guide member, said drive means comprising a selectively operated solenoid, an actuating rod joined to said solenoid to effect movement of said rod during operation of said solenoid, bell crank means connected to said rod and said knife and operatively related to said guide member to effect a composite motion of said knife, the motion of said knife having a component perpendicular to, and a component transverse to, the longitudinal dimension of said traveling web, the motion of said knife-edge in the transverse component being substantially parallel to the face of said web.

References Cited in the file of this patent
UNITED STATES PATENTS

| | | |
|---|---|---|
| 1,051,034 | Vautier-Dufour | Jan. 21, 1913 |
| 1,195,310 | White et al. | Aug. 22, 1916 |
| 1,494,593 | Depue | May 20, 1924 |
| 2,051,222 | Odell | Aug. 18, 1936 |
| 2,256,396 | Luboshez | Sept. 16, 1941 |
| 2,315,452 | Pifer | Mar. 30, 1943 |
| 2,332,810 | Place | Oct. 26, 1943 |
| 2,388,837 | Dye | Nov. 13, 1945 |
| 2,478,641 | Rose et al. | Aug. 9, 1949 |
| 2,497,606 | Herrmann | Feb. 14, 1950 |
| 2,517,414 | Pratt et al. | Aug. 1, 1950 |
| 2,751,814 | Limberger | June 26, 1956 |